B. H. HADLEY.
Boot and Shoe Channeling Machines.
No. 143,237. Patented September 30, 1873.
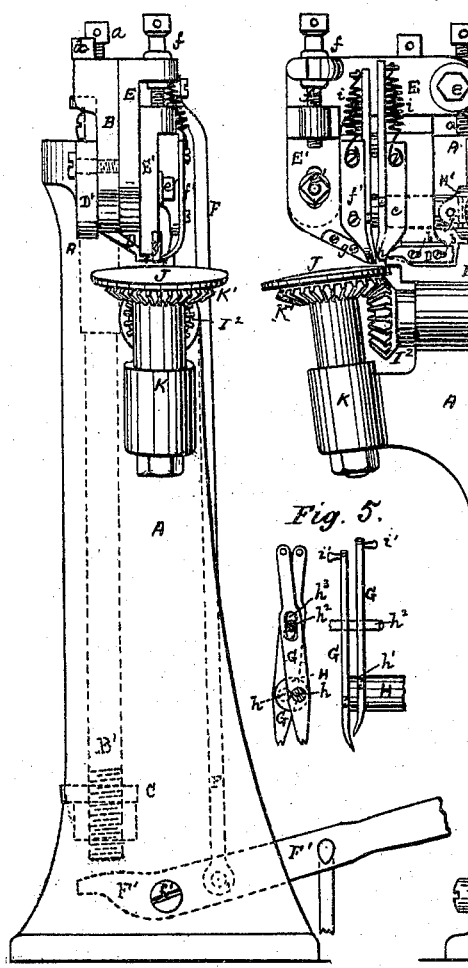
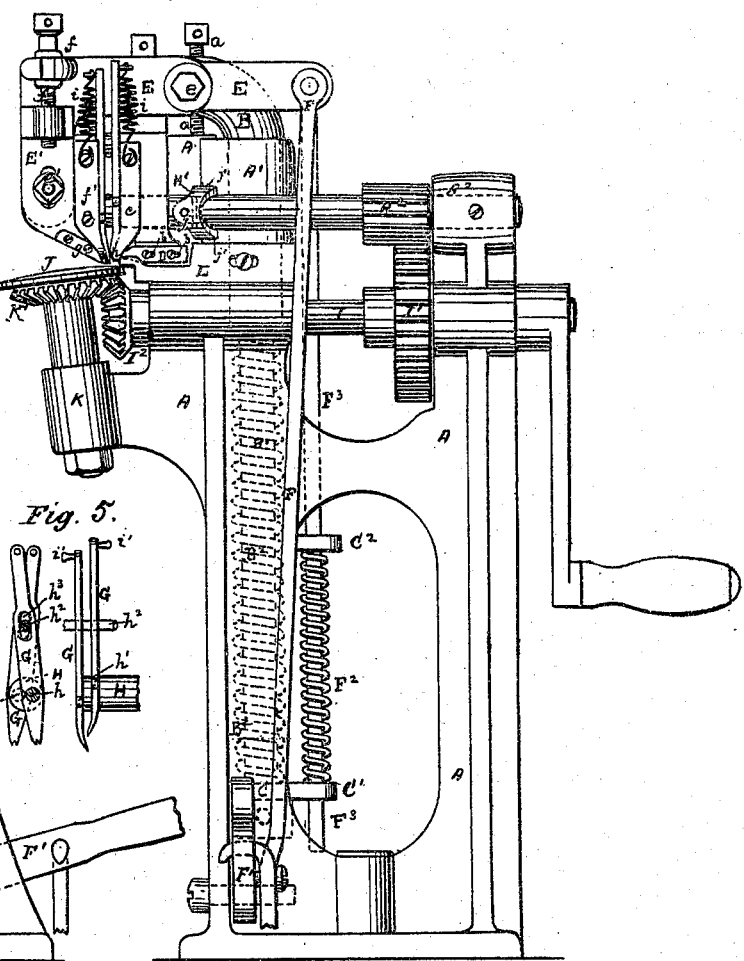
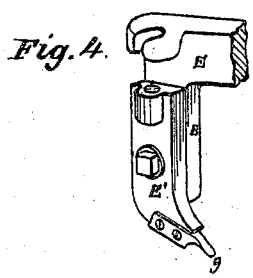
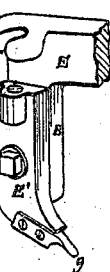
Inventor.
Benjamin H. Hadley.

UNITED STATES PATENT OFFICE.

BENJAMIN H. HADLEY, OF BROOKLYN, NEW YORK.

IMPROVEMENT IN BOOT AND SHOE CHANNELING-MACHINES.

Specification forming part of Letters Patent No. 143,237, dated September 30, 1873; application filed August 21, 1873.

*To all whom it may concern:*

Be it known that I, BENJAMIN H. HADLEY, of Brooklyn, Kings county, New York, have invented certain new and useful Improvements in Boot and Shoe Sole Channeling-Machines, of which the following is a specification:

The machinery to which my invention is particularly directed is that adapted to channel boot and shoe soles to prepare them for machine sewing. The soles for this purpose have formed in them on one of their faces an inside channel or slit extending parallel with the edge of the sole, and an outside angle L or V groove directly in the edge of the sole. Soles have before been thus channeled by machinery.

The object of my invention is to simplify and render more effective the mechanism by which this result is attained, and to produce a machine of which all working parts shall be entirely under the control of the operator, for separate adjustment with relation to, or removal bodily and together from, the work, and shall be disposed or located to operate to the best advantage upon the sole.

The machine in which my invention is comprised is characterized chiefly by the following features: First, an inside channel-knife or cutter, and a knife-stock in which said knife is secured at the proper inclination to make the slanting cut required for the inside channel, in combination with a vibratory frame or arm carrying said cutter-stock, and having its axis of vibration so located and arranged, that when it is moved to cause the knife to enter or withdraw from the work, the said knife will move in the path or plane of the slanting channel already formed or about to be formed in the sole, thus preventing possibility of the knife making a false cut.

Second, a feed mechanism, composed of feed-dogs having a compound vibratory or walking movement, so that each alternately and in succession will press down on and take hold of the work and carry it along, the one taking hold of the work just as the other leaves or is about to leave it to move forward and take a fresh hold, thus keeping the work moving continuously and evenly. Another essential advantage of this feed mechanism is that in turning short corners, only one point or dog is in the sole at one time, so that the sole turns on the said point as on a pivot; whereas, with the ordinary feed-roll, several teeth being pressed into the sole at the same time, it is more difficult to turn short corners.

Third, the combination, with the vibratory feed-dogs, or the equivalent thereof, of a circular revolving table or support for the work, rotating at such speed that that portion of it which passes under and in the plane of the feed-dogs, will travel at the same rate as that at which the dogs carry along the work. The object of thus rotating the table is to avoid the friction which would result were the feed-dogs to drag or draw the work over a stationary surface. Moreover, the table by revolving tends to crowd and hold more firmly the edge of the sole against the edge-gage employed in machines of this character.

Fourth, a revolving, circular, convex-faced table or support for the work placed at a slight inclination to the horizontal, with its upwardly-tilted part under the feed mechanism, and rotating at speed bearing the relation to the rate of feed, as specified in the clause preceding. The object I have in view in thus forming and arranging the table is to impede the work as little as possible, and to allow the operator to more freely and readily manipulate the work and turn it to the various positions required.

Fifth, the arrangement of the channel-cutters or knives and the feed mechanism on a vertically movable head, held down toward the table or support for the work with a yielding pressure, and adapted to elevate the cutting and feeding mechanism entirely from the work, or to adjust the same at any desired distance from the table, according to the thickness of the material to be operated on.

Sixth, the combination of said vertically-moving head, carrying the outside channel or groove cutter and feed mechanism, with the vibratory arm, which carries the inside slanting channel-knife, the said arm being pivoted to the head, and the two being connected to a single lifting-lever, in such manner that the movement of the lever to elevate the feed and cutting devices may first cause the inside channel-knife arm to vibrate sufficiently to withdraw said knife from the work before the head begins to rise and carry with it all the feed and cutting devices, including said vibratory arm.

I shall now describe the manner in which my invention is or may be carried into effect, by reference to the accompanying drawing, in which—

Figure 1 is a front elevation of a machine made in accordance with my invention. Fig. 2 is a side elevation of the same. The remaining figures are views of detached parts, hereinafter referred to.

The main frame of the machine is shown at A. Suitably supported in it, so as to be capable of vertical movement, is the head B, which carries the feed and cutting mechanisms. The head is provided with a vertical stem, $B^1$, indicated by dotted lines, passing through and supported in a tubular bearing or sleeve, $A^1$, in head A. The stem is surrounded by a spiral spring, $B^2$, indicated by dotted lines in Fig. 2, which presses at the upper end against frame A, and at its lower end against a collar, C, on the stem, which is adjustable thereon to regulate the tension of the spring. The head is thus held down by the spring with a yielding pressure. The extent to which the head may be depressed is governed by a set-screw, $a$, carried by it, the lower end of which bears upon the top of the frame A. By turning this screw its end may be projected more or less toward frame A, thus maintaining the head in its normal position, at any desired height above the work-table or support. On a suitable part of the head is carried the stock for the outside channel or angle groove-cutter D, shown detached in Fig. 3, which is arranged in a horizontal position, and is attached to the stock by set-screws passing through slots $b$, Fig. 2, by which the cutter can be adjusted, or projected more or less from the front of the machine. The depth of cut made by this cutter is regulated by a vertical gage, $c$, attached adjustably to the head, so that it may be moved up and down, and arranged with its lower end in proximity with the cutter D, to bear upon the work in front of and in the immediate neighborhood of the cutter. Cutter D is attached to a stock, D', on the head, vertically adjustable by means of a set-screw, $d$, to set the cutter at different distances from the table, according to the thickness of the material to be operated on and the nature of the work to be performed.

In lieu of thus placing the outside edge knife or groover D on the movable head, I can, and in practice do, so form the machine that the knife may be mounted on some stationary part, D, in such a manner that it will leave the edges of the soles of a perfectly uniform thickness, irrespective of variations in the thickness of the leather, whether said variations exist in different parts of the same sole, or in case some soles are thicker than others.

In the method of mounting said edge knife or groover D, hereinbefore described, the thickness of the edge will vary with the thickness of the leather; but when it is desired to preserve a uniform thickness of the edges, as is required for certain styles of work, the stock carrying the edge knife or groover D, instead of being mounted upon the movable head B, is mounted upon the stationary frame A, being fastened by screws in the proper position to reduce the edge of the sole to the uniform thickness required. In practice, the same stock may be used for either class of work, being shifted from the head B to the frame A, according to the class of work it is desired to make.

Upon the head B is pivoted, at $e$, a horizontal arm, E, which, at its outer end, carries the downwardly-extending stock E', held to the arm by a screw, $e'$, passing through a slot, and vertically adjustable by means of a set-screw, $f$, as shown in Fig. 2. The lower end of the stock slants inward, and carries the inclined cutter $g$, placed at the proper angle to make a slit or channel of the desired inclination in the sole. The cutter and its stock are shown detached in Fig. 4. With the knife is combined a gage, $f'$, for regulating the depth of its penetration, it being for this purpose secured to and made adjustable on the head B, like the gage $c$.

The pivot $e$ is so located, with relation to the knife $g$, as seen in Fig. 2, that when the arm is vibrated the knife will, for the purpose hereinbefore stated, move in or out in the plane of the slit cut or to be cut in the sole.

The vibratory movement of the arm is effected through the agency of a connecting-rod, F, jointed at one end to the arm, and at the other end to a lever, F', pivoted at $f'$ to the base of frame A. By depressing the lever the connecting-rod will be drawn down to elevate the front end of arm E, and consequently the knife $g$. The return of the arm E is accomplished by means of a spiral spring, $F^2$, surrounding a rod, $F^3$, jointed at its upper end to the arm E, and passing through a tubular bearing or sleeve, $C^1$, fixed to and projecting laterally from collar C. The spring $F^2$ is held between the sleeve $C^1$ and a collar, $C^2$, on rod $F^3$. It is compressed between these two parts by the downward movement of lever $F^1$, and thus serves to return the vibratory arm to its normal position, when downward pressure is removed from the said lever. The shorter arm of lever $F^1$ is directly under the lower end of stem $B^1$, and is at such distance from it usually that, as indicated in Fig. 1, the lever may be depressed far enough to tilt the arm E far enough to remove the knife $g$ from the work before the shorter arm of the lever comes in contact with stem $B^1$. By continuing the downward movement of the lever after such contact, the whole head B, with all the parts which it carries, will be bodily raised. Thus by this arrangement the single lever $F^1$ can operate the vibratory cutter-arm independently of the other parts, or can raise the head and said arm bodily and together, as occasion demands.

The feed devices I employ consist of a pair of feed-dogs, G G, with serrated or toothed lower ends, arranged vertically, or nearly so, over the work-table, and having imparted to them a compound vibratory or walking motion, which enables them to act on the work in the manner hereinbefore indicated. The feed-dogs are arranged between the two channel cutters or knives, and each is mounted loosely at or near its lower end on a separate crank-pin, $h$, on the front end of a shaft, H, as indicated in Fig. 5, which represents the dogs in front and side elevation, the dogs being placed in parallel planes, the one somewhat in advance of the other, so that they may clear each other. The crank-pins are located diametrically opposite one another, one on each side of the axis of the shaft H. The two dogs, at the point where they are mounted on the crank-pins, are separated by a washer, $h^1$. The upper ends of the dogs are steadied and held by means of a stationary pin or pivot, $h^2$, common to the two, passing through a longitudinal slot, $h^3$, formed in each, which slot permits each dog to move up and down to follow the movement of its crank. Springs $i$, one for each dog, attached at one end to laterally-projecting pins $i$ on the dogs, and at the other to suitable points on the head B, serve to steady and exert a downward pressure on the dogs. When shaft H is revolved it will be seen that the dogs will have imparted to them a compound vibratory movement resembling a walking motion, each alternately and in succession descending on the work, carrying it forward and then releasing it, rising and moving back to take a fresh hold, the one taking hold just as the other is about to leave the work, thus keeping the latter continuously in motion.

In order to allow the dogs to adapt themselves to the work and to yield to irregularities, I make the shaft H in two parts, jointed together by a sleeve, H¹, sufficiently large to allow the ends of the shaft to move, as hereinafter described, and jointed by pivots to said ends, the pivot $j$, which unites the sleeve with the one part of the shaft, being in a plane at right angles with the pivot $j^1$ which unites the sleeve with the other part. In this way the two sections of the shaft are united by what may be considered a universal joint, or a joint which at least will allow the dog, carrying part of the shaft, to rise and fall at any point of its rotation sufficiently to permit the dogs to adapt themselves to variations in thickness of material. The springs $i^1$ serve to offer a yielding resistance to the upward movement of the front section of shaft H. The shaft H at its front end is supported in a vertically-moving bearing in head B, and at its rear end is supported in a rocking bearing, A², in frame A, in which bearing it can slide. This latter bearing allows the shaft to tilt to follow the movement or conform to the adjustment of the head B. The shaft is driven by a pinion, H², fixed on it, engaging a gear, I¹, on main driving-shaft I, which is revolved by hand or by power, as the case may be. The table or support for the work is indicated at J. It consists of a disk or circular plate, of suitable diameter, fixed on a vertical stem, secured and adapted to revolve in an upright tubular bearing-sleeve, K, on the front of frame A. The revolution of the table is effected by means of a beveled gear, K′, on its under side engaging a corresponding gear, I², on the front end of driving-shaft I. The driving-gears should be so proportioned that the rate of movement of that part of the table that comes under the feed-dogs should be the same as that at which the work is carried along by the feed mechanism for the purpose hereinbefore indicated. As usual in machines of this character, a horizontal edge-gage, L, is employed to determine the distance to which the sole may be inserted under the cutters, the gage being adjustable longitudinally for this purpose.

I much prefer, for the reasons hereinbefore given, to make the table with a convex upper surface, as shown in the drawing, and to tilt it at an inclination to the horizontal, its upwardly-tilted part being designed to receive the work which is passing under the cutters. This arrangement is plainly indicated in the drawing, and the advantages resulting from it are apparent without further explanation.

I would remark that with a table of this character, capable of rotating, as described, any suitable feed mechanism other than the special devices herein described, which will carry along the work continuously, can be used to advantage.

Having now described my invention, I wish it to be understood that I do not limit myself to the special mechanical details herein described in illustration of the manner in which my invention may be carried into effect, for the same may be varied in many respects without departure from the principle of the invention.

What I claim is as follows:

1. The herein-described feed mechanism consisting of feed-dogs arranged to move above and in contact with the work, and having a compound vibratory or walking movement, so that each, alternately and in succession, will take hold of and carry along the sole, the one taking hold of the work just as the other is about to leave it, substantially as herein shown and set forth.

2. In combination with the feed mechanism, the cutter mounted upon a vibratory arm in the manner substantially as herein shown and described, so as to cut into the sole, forming the inside channel at the proper angle with respect to the sole, and that it may be withdrawn therefrom, substantially as and for the purpose set forth.

3. The combination of the feed-dogs, moving on a fixed gudgeon passing through slots in their upper ends, with the crank-shaft for operating said dogs, substantially as shown and described.

4. The divided crank-shaft carrying the feed-dogs, and mounted at one end in the vertically-movable head, and at the other end in a rocking bearing on the main frame, under the arrangement and for operation as shown and set forth.

5. In a boot and shoe sole channeling-machine, the combination, with a top feed mechanism, of a revolving circular convex-faced table or support for the work, placed at an inclination to the horizontal, with its upwardly-tilted part located under the feed mechanism, and moving at the same rate of speed at which the work is fed along, substantially as shown and described.

6. The cutting and feed mechanisms arranged on and carried by a vertically-movable head held down toward the table or support for the work with a yielding pressure, and adapted to elevate said mechanisms entirely from the work, or to adjust them bodily and together at different distances therefrom, substantially as and for the purposes shown and described.

7. The combination of the vertically-movable head with the vibratory arm carrying the inside-slanting channel-knife and pivoted to the head, substantially as shown and set forth.

8. The vertically-movable head carrying the outside groove-cutter and feed mechanism, and the vibratory slanting knife-carrying arm pivoted to said head, as described, the two being provided with recoil springs, and connected together by means substantially such as specified, in combination with a single lifting-lever arranged to operate in connection with said parts, in the manner shown and set forth.

In testimony whereof I have signed my name in the presence of two subscribing witnesses.

BENJAMIN H. HADLEY.

Witnesses:
CHAS. GOODYEAR, Jr.,
CHAS. T. DE FOREST.